July 17, 1928.
E. P. SEGHERS
TIRE DEFLATER
Filed Oct. 2, 1922
1,677,301
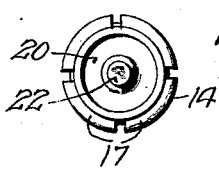
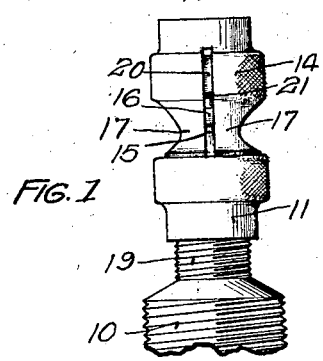
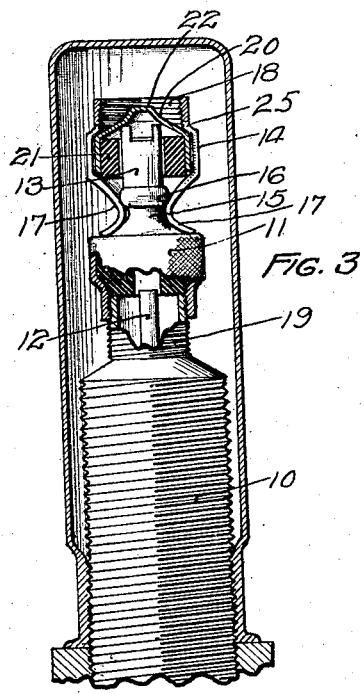
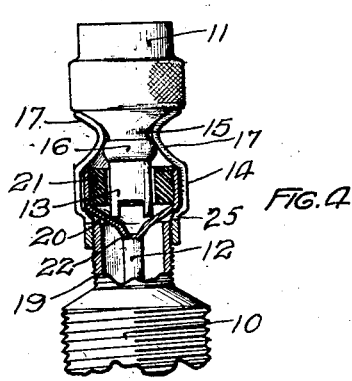
INVENTOR:
Emiel P. Seghers
BY Nissen & Crane
ATTYS.

Patented July 17, 1928.

1,677,301

UNITED STATES PATENT OFFICE.

EMIEL P. SEGHERS, OF CHICAGO, ILLINOIS.

TIRE DEFLATER.

Application filed October 2, 1922. Serial No. 591,733.

This invention relates to a device for use in connection with valves for pneumatic tires by means of which the valve may be held in open position to permit escape of air while deflating the tire.

It has for its object the provision of such a device which shall be economical to manufacture, convenient to operate, and which may be connected to the valve cap so that it may always be at hand when needed.

The invention is exemplified in the combination and arrangement of parts shown in the accompanying drawing and described in the following specification, and it is more particularly pointed out in the appended claims.

In the drawing,—

Fig. 1 is a fragmentary elevation of a pneumatic tire valve stem having one embodiment of the present invention attached thereto.

Fig. 2 is a top plan view of Fig. 1.

Fig. 3 is a vertical sectional view showing a valve stem having the present invention carried thereon and having the dust cap placed on the valve stem.

Fig. 4 is a view similar to Fig. 1, but having parts in section and having the valve cap removed and the tire deflater in operative position.

Referring more specifically to the drawings, the numeral 10 designates the valve stem of a pneumatic tire having a cap 11 for closing the end of the stem. Valves of this nature are commonly provided with a deflating pin 12 connected with the air valve so that inward pressure on the end of the pin will open the valve and permit escape of air. It has heretofore been the practice to hold the pin 12 in its inward position by means of any instrument which the operator could secure such as the point of a knife blade or a match or toothpick, thus permitting the air to escape when it was desired to deflate the tire for repairs or other purposes. This is an inconvenient and tedious operation especially when complete deflation is desired, requiring the tube to be rolled upon itself to expel all the air. To avoid this tedious operation it is not infrequent for the operator to reverse the cap 11 and use the valve wrench pin 13 to remove the valve entirely so that the air can escape freely. If this is done, however, the valve is very apt to be injured or destroyed so that when replaced it will fail to form a tight seal.

In the present invention a second cap 14, somewhat similar to the cap 11, is removably attached to the projecting portion 13 of the closure cap. To hold the deflating cap 14 in place when not in use the projecting pin 13 is provided with a circumferential groove 15 and a bead 16 to engage a spring socket formed of tongues 17 carried by the cap 14. The outer ends of the tongue 17 are dished to form a bell-shaped socket, which will pass readily over the projection 13 and snap into place in the groove 15. This will permit easy removal of the cap 14 and yet will hold it in place without danger of loss when not in use. The end of the cap 14 opposite the tongue 17 is provided with a threaded portion 18 for engaging the threads 19 on the end of the valve stem 10. The threaded portion 18 is of slightly less diameter than the body portion of the cap and a sheet metal cup 20 is placed within the cap 14 and held in position by any suitable means. In the present instance, the cup 20 will not fall out of the cap 14 because the peripheral diameter of the cup 20 is larger than the inside diameter of the threaded portion 18 of the cap 14. The cup 20 is shown as fitting over the rubber ring 21 frequently found upon the projection 13 and sold with the cap 11. The cup 20 has a central projection 22 in position to engage the end of the stem 12 and press the stem inwardly as shown in Fig. 4 when the cap 14 is screwed onto the threads 19. When the deflater cap 14 is in this position the valve will be held open so that the air can escape without any further attention on the part of the operator. To deflate the valve, therefore, all that is necessary is to unscrew the cap 11 and reverse the part threading the cap 14 on to the place originally occupied by the cap 11. The deflator will always be in convenient position and yet will not interfere with the use of the projection 13 for removing the valve when necessary since the deflating cap can be easily removed and again snapped into position after the valve wrench pin 13 has been used for removing or replacing the valve. The length of the valve cap is but very slightly increased by the presence of the deflating cap, as can be seen from Fig. 3, so that the entire device is readily contained in the usual dust cap. If an unusual short dust cap should be used so that the end of the dust cap will engage the deflating cap, no harm can be done since the ends of the tongues 17 bear upon the shoulder formed by the top of the cap 11, so that the deflating cap forms a fixed abutment against which the end of the dust cap could be tightened without injury to any part.

During deflation the escaping air passes out through the slots between the tongues 17, which slots extend beyond the abutment cup 20 as shown at 25.

I claim:

1. A tire deflater comprising a shell threaded at one end for engaging a pneumatic valve and having spring clips at the opposite end thereof for engaging a valve stem wrench on a valve cap.

2. A tire deflater comprising a shell having internal threads at one end thereof, spring clips at the opposite end thereof for engaging a valve stem wrench on a valve cap, a partition extending across said shell and having an abutment member at the side thereof adjacent said internal threads, and means for holding said partition in position in said shell.

In testimony whereof I have signed my name to this specification on this 30th day of September, A. D. 1922.

EMIEL P. SEGHERS.